US012336611B2

(12) United States Patent
Sunderland

(10) Patent No.: US 12,336,611 B2
(45) Date of Patent: Jun. 24, 2025

(54) APPARATUS FOR CURLING HAIR

(71) Applicant: The House of Curls LTD, North Yorkshire (GB)

(72) Inventor: Gary Sunderland, Yorkshire (GB)

( * ) Notice: Subject to any disclaimer, the term of this patent is extended or adjusted under 35 U.S.C. 154(b) by 245 days.

(21) Appl. No.: 16/061,605

(22) PCT Filed: Dec. 12, 2016

(86) PCT No.: PCT/GB2016/053917
§ 371 (c)(1),
(2) Date: Jun. 12, 2018

(87) PCT Pub. No.: WO2017/098282
PCT Pub. Date: Jun. 15, 2017

(65) Prior Publication Data
US 2019/0183224 A1 Jun. 20, 2019

(30) Foreign Application Priority Data
Dec. 11, 2015 (GB) ..................................... 1521906

(51) Int. Cl.
*A45D 7/02* (2006.01)
*A45D 2/10* (2006.01)
(Continued)

(52) U.S. Cl.
CPC ............... *A45D 2/122* (2013.01); *A45D 2/10* (2013.01); *A45D 2/14* (2013.01); *A45D 2/148* (2013.01);
(Continued)

(58) Field of Classification Search
CPC . A45D 2/02; A45D 2/10; A45D 2/122; A45D 2/14; A45D 2/141; A45D 2/148;
(Continued)

(56) References Cited

U.S. PATENT DOCUMENTS 2,256,143 A * 9/1941 Dunlavy .................. A45D 2/10 132/251
2,383,612 A * 8/1945 Morton .................... A45D 2/10 132/253
(Continued)

FOREIGN PATENT DOCUMENTS

CN 2497602 Y 7/2002
DE 29918611 U1 * 12/1999 ............... A45D 2/10
EP 2690982 B1 2/2014
GB 539001 A 8/1941

OTHER PUBLICATIONS

DE 299 18 611 U! EPO Patent Translate (Year: 1999).*
Translate (Year: 1999).*

*Primary Examiner* — Rachel R Steitz
(74) *Attorney, Agent, or Firm* — CM LAW PLLC; Robert Klinger

(57) ABSTRACT

Apparatus for curling hair comprises first and second side portions which are secured together in a spaced apart relationship via a connector portion. The connector portion is positioned substantially centrally with respect to each side portion. The connector portion has a length of not more than 20 mm. The side portions are fabricated from a material which is both resilient and thermally conductive.

14 Claims, 6 Drawing Sheets

(51) Int. Cl.

| | |
|---|---|
| ***A45D 2/12*** | (2006.01) |
| ***A45D 2/14*** | (2006.01) |
| ***A45D 4/16*** | (2006.01) |
| ***A45D 4/18*** | (2006.01) |
| ***H05B 3/44*** | (2006.01) |

(52) U.S. Cl.
CPC ................. *A45D 4/16* (2013.01); *A45D 4/18* (2013.01); *A45D 7/02* (2013.01); *H05B 3/44* (2013.01)

(58) Field of Classification Search
CPC ................ A45D 2/20; A45D 2002/003; A45D 2002/025; H05B 3/44
See application file for complete search history.

(56) References Cited

U.S. PATENT DOCUMENTS

| | | | | | |
|---|---|---|---|---|---|
| 2,452,225 | A * | 10/1948 | Coloccia | A45D 2/10 | 132/247 |
| 2,515,751 | A * | 7/1950 | Warrington | A45D 2/10 | 132/245 |
| 3,343,549 | A * | 9/1967 | Weitzner | A45D 2/10 | 132/251 |
| 5,033,487 | A * | 7/1991 | Barradas | A45D 2/20 | 132/265 |
| 8,671,957 | B1 * | 3/2014 | James | A45D 2/10 | 132/247 |
| 2013/0263881 | A1 * | 10/2013 | Story | A45D 2/001 | 132/223 |

* cited by examiner

APPARATUS FOR CURLING HAIR

FIELD OF THE INVENTION

The present invention relates to apparatus and method for curling hair.

BACKGROUND OF THE INVENTION

Known apparatus for imparting curls to lengths of hair include heated curling irons, curling tongs and wands, most of which comprise a cylindrical heated element attached to a handle. To use these devices each length of hair to be curled is wound around the heated element and then removed, repeating the action on different length of hair around the head.

Rollers are also commonly used for curling hair. Rollers may be unheated or can be pre-heated before use. Heated rollers comprise a hollow cylindrical roller body which is heated before use. A length of hair is wrapped around the roller from starting at the end of the hair and rolling towards the scalp. The roller is then secured at the scalp and heat from the roller transfers to the hair wrapped around it as the roller cools. Heated rollers are typically quite heavy and there is always a risk that the user may burn their fingers when putting the rollers into the hair. In addition, rollers can generally only be used to wrap hair in one direction, that is from the end of the hair to the scalp, thereby producing only one type of curl.

U.S. Pat. No. 8,671,957 describes a hair curling device having a flexible flat base portion, a stem secured to the base portion and a bowl portion which comprises a frusto-conical portion extending from the stem and having a flange extending from its top edge. With hair wrapped around the stem the frusto-conical portion is folded over so that the flange aligns with the base. The frusto-conical wall decreases in thickness from the stem to the flange where the thickness is smallest.

It would be desirable to provide an improved apparatus for curling hair for use both in salon and home environments.

SUMMARY OF THE INVENTION

According to the invention there is provided apparatus for curling hair comprising first and second side portions which are secured together in a spaced apart relationship via a connector portion, the connector portion being positioned substantially centrally with respect to each side portion; wherein the connector portion has a length of not more than 20 mm and wherein the side portions are fabricated from a material which is both resilient and thermally conductive.

Preferably the connector portion is substantially cylindrical in shape. In use, hair to be curled is wound around the connector portion of the apparatus.

Preferably the connector portion has a length not more than 15 mm. Advantageously, the connector portion is between 10 mm and 15 mm and more advantageously, 13 mm.

Preferably the side portions each have a width that is substantially larger than the length of the connector portion. More preferably, the side portions each have a width that is at least three times larger than the length of the connector portion, still more preferably, the side portions have a width that is six time larger than the length of the connector portion. The ratio of width of the side portions to the length of the connector helps to ensure that all of the hair to be curled is covered by the side portions and helps ensure even delivery of heat to the hair during heating and from the hair during cooling.

The side portions may be between 60 and 80 mm wide and preferably between 70 and 80 mm wide and more preferably between 73 and 78 mm wide.

Preferably, at least one of the side portions is provided with means for securing a part, such as an end, of a section of hair to the apparatus. More preferably, the means for securing a part, such as an end, of a section of hair to the apparatus comprises a slot with an opening at an edge of the at least one side portion. The slot may be V shaped, the opening of the slot being widest at the edge of the side portion and narrowing towards the connector portion. Alternatively, the slot may have parallel sides.

Each of the first and second side portions may be circular in shape.

Each of the first and second side portions may be substantially flat.

Alternatively, the first side portion may be configured such that it is provided with two fixed states: a first state in which the first side portion is convex in shape and curves away from the second plate; and a second fixed state in which the first side portion is concave in shape and folds over to cover both the connector portion and the second side portion.

In this embodiment of the invention the first side portion is folded over the second side portion after the hair has been wound around the connection portion. This helps to hold the hair in place, to heat the hair rapidly and to secure the apparatus in the user's hair. Typically, in this embodiment the side portion that is curved is slightly wider than the side portion that is flat.

Each of the first and second side portions have an outer circumference and at least one of the first and second side portions may be provided with a plurality of protrusions located on the outer circumference, oriented towards the other side portion.

Alternatively, both of the first and second side portions are provided with a plurality of protrusions located on the outer circumference of each side portion and the protrusions on each side portion are oriented towards the other side portion. Preferably, the protrusions are arranged such that the protrusions of first side portion are located in between the protrusions of the second side portion when the first side portion is folded over to cover both the connector portion and the second side portion. The advantage of such an arrangement of protrusions is that it helps to grip the hair within the apparatus.

In any of the embodiments one or both of the side portions may include a plurality of holes therein. The advantage of such an arrangement is that heated hair may cool more quickly. Cooling of the hair is required to set the curl in the hair.

The connector portion may be provided with a plurality of holes therein. Preferably the connector portion is hollow.

According to another aspect of the invention there is provided apparatus for curling hair comprising first and second side portions which are secured together in a spaced apart relationship via a connector portion, the connector portion being positioned substantially centrally with respect to each side portion; wherein the side portions each have a width that is at least three times larger than the length of the connector portion and wherein the side portions are fabricated from a material which is both resilient and thermally conductive.

According to another aspect of the invention there is provided a method of forming curls in hair using the apparatus described above, comprising the steps of:

winding a section of hair around the connector of the apparatus;

securing the wound section of hair in place on the apparatus;

heating the apparatus and section of hair with a heater.

Advantageously, the heater is a hair straightener, which may have heating plates of a shape corresponding to the shape of the apparatus.

Where the apparatus includes a slot, the section of hair may be engaged in the slot prior to winding around the connector of the apparatus. Preferably, the section of hair is engaged in the slot proximate the scalp. Alternatively, the section of hair may be engaged with the slot at the free end of the section of hair, or between the free end and the scalp.

The step of securing the wound section of hair in place on the apparatus may comprise tucking a part of the section of hair under another part of the section of hair. Alternatively, the wound section of hair may be held in place on the apparatus by the side member in its convex configuration and/or a tie or a stretchable band may be placed over the wound section of hair.

BRIEF DESCRIPTION OF THE DRAWINGS

In the drawings, which illustrate a preferred embodiment of apparatus for curling hair, and are by way of example.

DETAILED DESCRIPTION OF THE PREFERRED EMBODIMENTS

Figure 1:
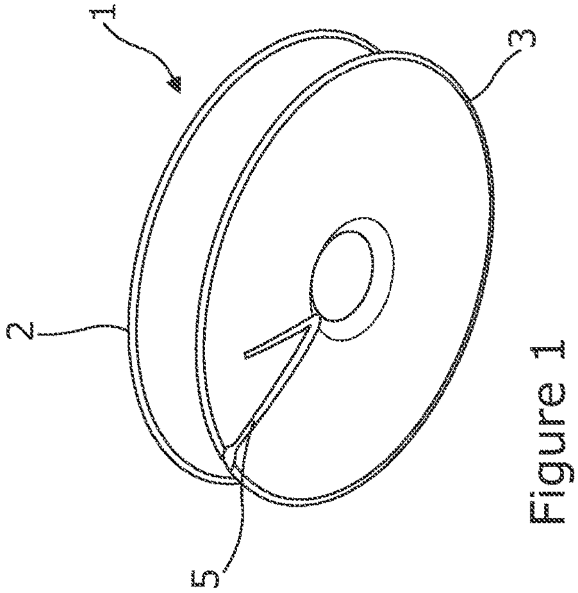
FIG. 1 is a perspective view of an embodiment of an apparatus for curling hair.
Figure 3B:
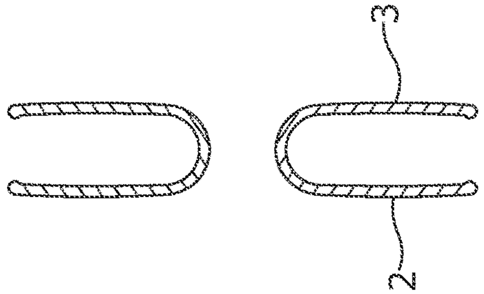
FIG. 3*b* shows a cross section through the apparatus of FIG. 1, along the line A-A shown in FIG. 3*a;*
Figure 3A:
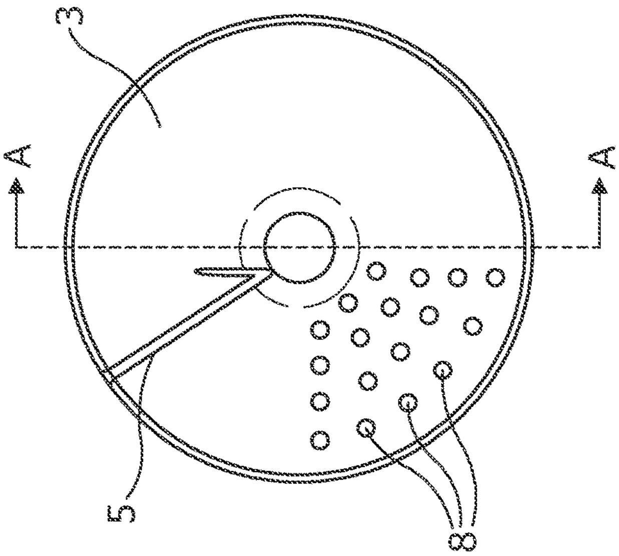
FIG. 3*a* is a plan view of the apparatus of FIG. 1.
Figure 2:
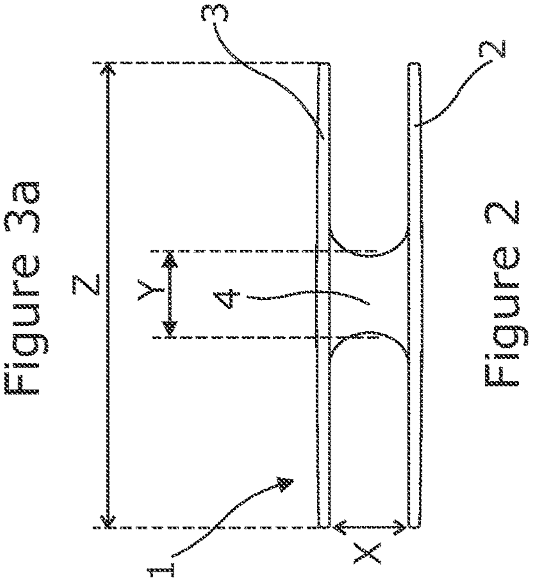
FIG. 2 is a side view of the apparatus of FIG. 1.

Referring now to FIGS. 1 to 3, an embodiment of a hair curling apparatus takes the form of a curler shown generally at 1. The curler 1 comprises two spaced apart side members 2,3 connected by a connector portion 4 (See FIG. 2). The connector portion 4 is hollow. In this example both of the side members 2,3 are substantially circular in shape and substantially flat in profile, as shown more clearly in FIG. 2. The curler 1 is fabricated from a silicon rubber that is thermally conductive. As shown in FIG. 3*a*, either or both of the side members 2, 3 may be formed with holes 8 therein. The connector portion 4 could also be provided with such holes. Where provided, the holes 8 would typically be made across the whole of one or both of the side members 2, 3.

To use the curler 1 a section of hair is wound around the connector portion 4. The hair can either be wound from the root to the free end, or from the free end to the root. As shown in the drawings, the curler 1 is preferably provided with a slot 5 in one of the spaced apart side members. In the illustrated example the slot 5 is a narrow 'V' shape. The slot 5 extends from the edge of the side member 3 and is used to secure the end of the section of hair, by simply tucking the end of the hair section into the slot 5. Since the side members 2,3 are made from a resilient material the hair ends pushed into the slot 5 are gripped by the side member 3. Alternative means of securing the hair in the curler 1 could be used.

Figure 4:
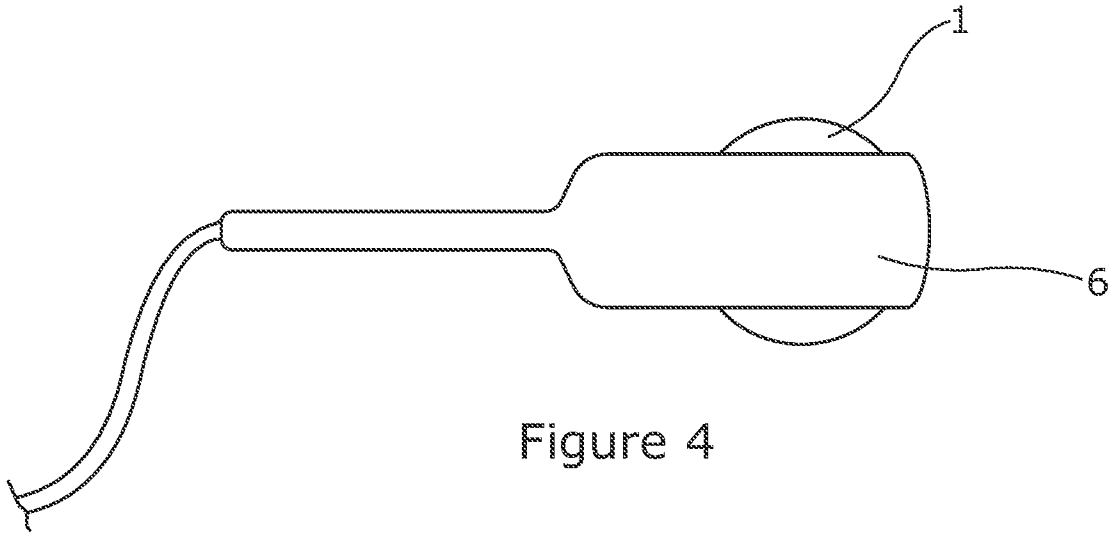
FIG. 4 illustrates the apparatus of FIG. 1 being heated using straightening irons.
Figure 7:
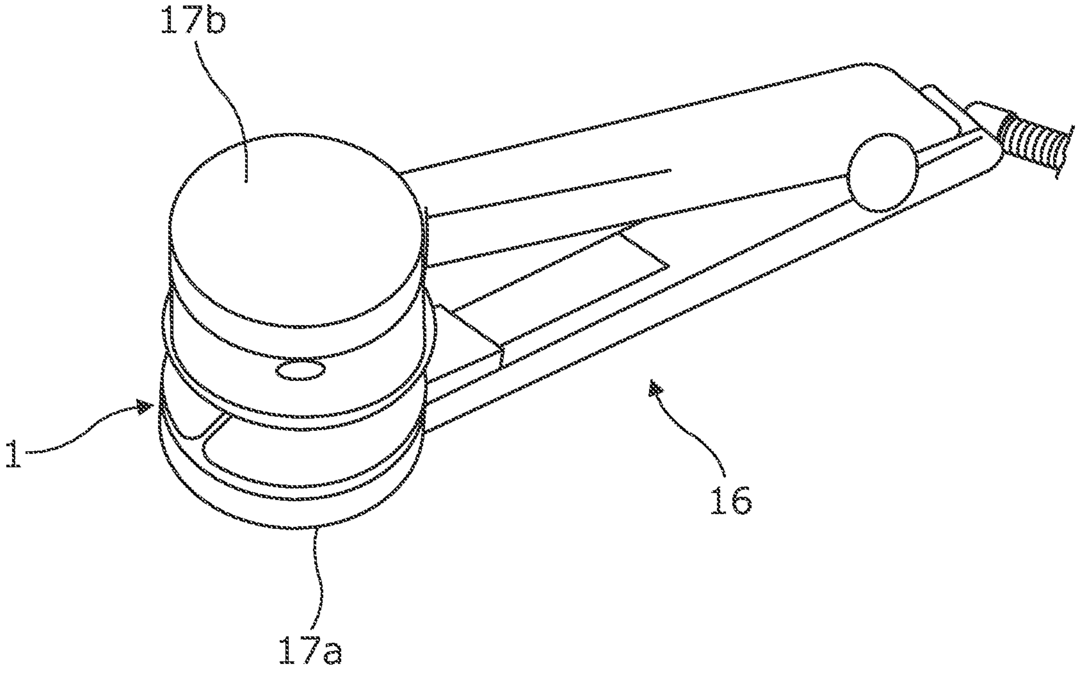
FIG. 7 is a schematic representation of a heater adapted for heating the apparatus illustrated in FIGS. 1 to 6*b;*

Once the section of hair has been wrapped around the connector portion 4 and secured in the curler 1, a pair of conventional hair straightening irons 6 are used to heat the curler 1, by simply clamping the straightening irons 6 around the curler 1 as shown in FIG. 4. Preferably the straightening irons 6 are clamped around the ruler 1 for a period of around 30 seconds. Rather than using straightening irons 6, a heater 16 of the type shown in FIG. 7 having heater plates 17*a*, 17*b* of a shape that corresponds to the shape of the curler 1 may be used. The advantage of using a heater of the type shown in FIG. 7, which may function in the same way as hair straightening irons is that heat is distributed to the hair in the curler more evenly.

Typically, a user would use a number of curlers 1 during one hair styling session, sectioning the hair into groups and winding each section onto a separate curler 1. The user would then heat each curler 1 in turn until all of the curlers have been heated. Since the side members 2, 3 are thermally conductive, the heat from the straightening irons is transferred to the hair. The diameter of each of the side members 2,3 is substantially greater than length of the connector 4. In the illustrated example the diameter Z of the curler 1 is 73 mm and the length of the connector 4, shown at X, is 14 mm. Having wide side members ensures that all the hair to be heated is contained within the curler 1, no matter how thickly it is wound, and this also ensures that heat is distributed evenly to all of the air contained within the curler 1. A hood drier could be used to heat the curlers 1 as an alternative to using hair straighteners. The curler 1 is preferably left with the hair wrapped around it until it cools. Once cooled the hair can be easily unwrapped from the curler 1, forming perfect spiral curls that do not quickly drop out of the hair. Serial curls may be formed with the curler 1 because the section of hair can be wound around the curler rather than the curler being rolled up the section of hair, as is conventional.

In a preferred embodiment, the side members 1 are fabricated from a material which changes colour when heated to the optimum temperature, and then reverts to the original colour when cooled. This would help a user identify which curlers 1 had been heated sufficiently, and would also alert a user as to when the curlers were cool enough to remove.

The diameter, Y, of the connector portion 4 may be varied to provide different types of curl. For example, use of an curler 1 with a narrow diameter connector portion 4 will result in tight spiral curls, whereas a curler 1 with a wide diameter connector portion 4 will result in larger waves.

The length of the connector portion 4 is important, since the apparatus 1 needs to be able to be gripped between the plates of straightening irons. In the example shown the length of the connector portion 4 is 14 mm.

Figure 5A:
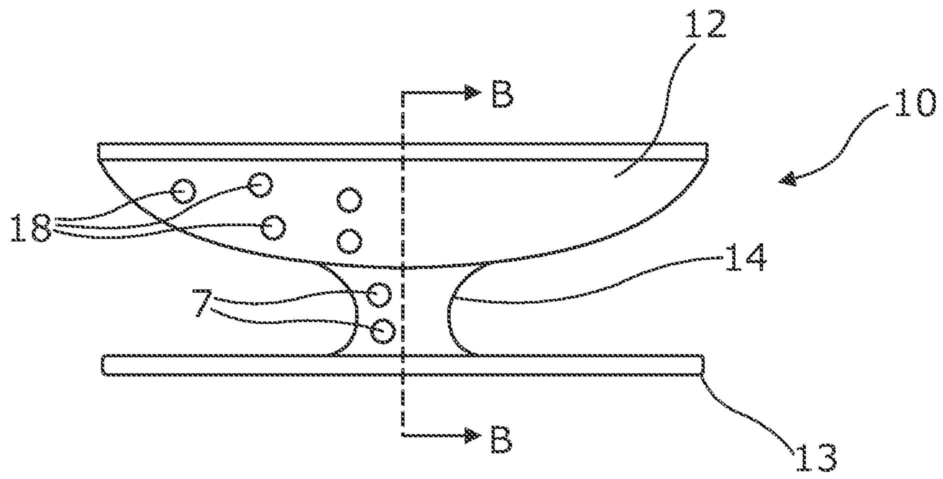
FIG. 5*a* is a side view of an alternative embodiment of apparatus for curling hair, in an open configuration.
Figure 5B:
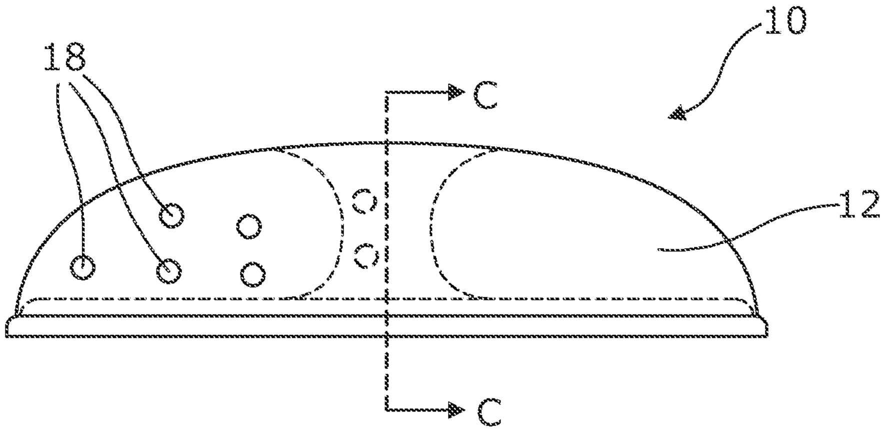
FIG. 5*b* is a side view of the apparatus of FIG. 5*a*, in a closed configuration.
Figure 6A:
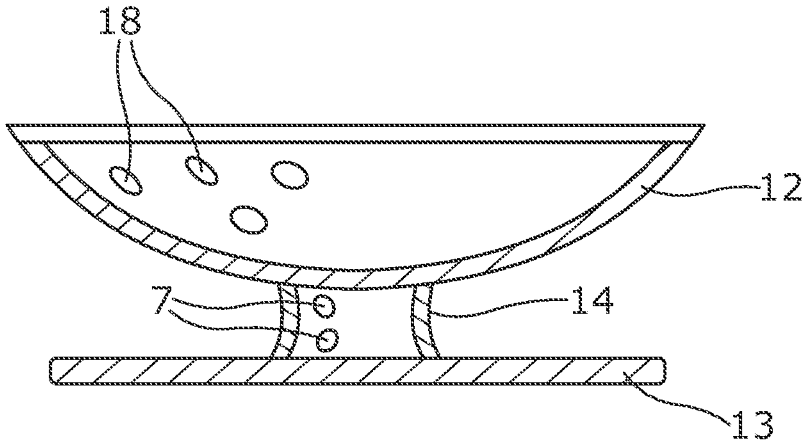
FIG. 6*a* shows a cross section through the apparatus of FIG. 5*a*, along the line B-B, the apparatus in the open configuration.
Figure 6B:
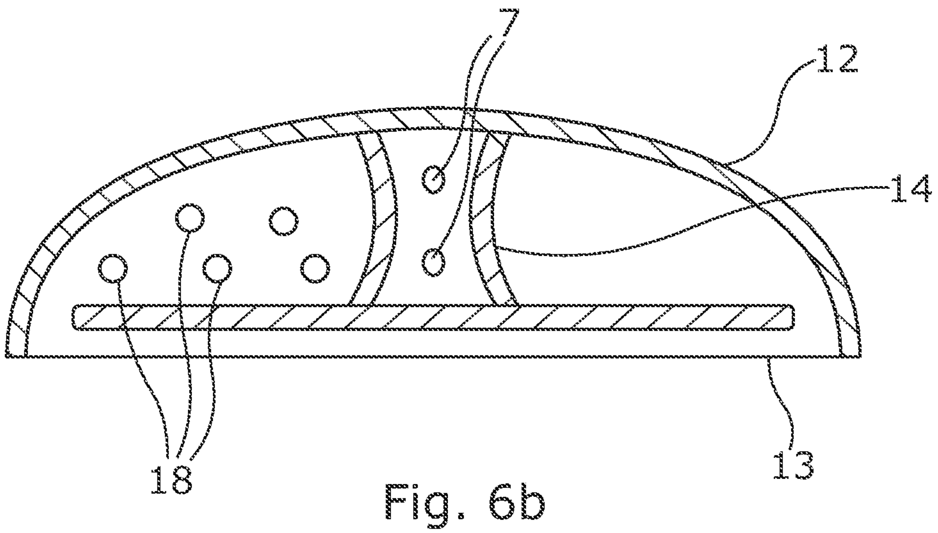
FIG. 6*b* shows a cross section through the apparatus of FIG. 5*b*, along the line C-C, with the apparatus in the closed configuration.

FIGS. 5 and 6 illustrate an alternative embodiment of the apparatus of the invention, which takes the form of a curler shown generally at 10. Curler 10 comprises two spaced apart side members 12, 13 connected by a connector portion 14. In this embodiment of the invention one of the side members 13 is substantially flat in profile and the other side member 12 is curved in shape. The side member 12 which is curved in shape is configured such that it has two fixed states. The first fixed state is illustrated in FIGS. 5*a* and 6*a*, where the side member 12 is convex in shape and curves away from the other side member 13. This is the open configuration of the curler 10, and allows for hair to be wound around the connector portion 14. The second fixed state is illustrated in FIGS. 5*b* and 6*b*, whereby the curved side member 12 has been folded over so that it is now concave in shape and curves over the top of the connector portion 14 and the other side member 13. This is the closed configuration of the curler 10, and allows hair wrapped around the connector portion 14 to be secured within the curler 10. The curler 10 is fabricated from a silicon rubber that is thermally conductive.

To use this embodiment of the apparatus, the hair is wound around the connector portion 14 of the curler 10 in the same manner as before, with the apparatus in the first, open configuration.

Figure 8A:
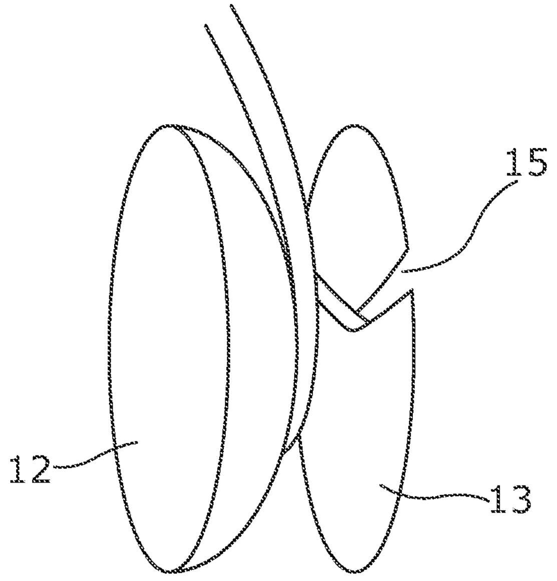
FIG. 8*a* is a schematic representation showing a section of hair at the commencement of winding onto the apparatus.
Figure 8B:
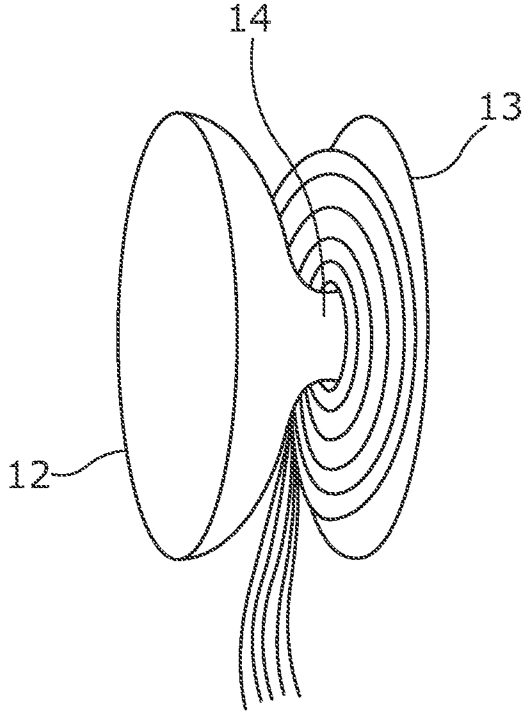
FIG. 8*b* is a schematic representation showing a section of hair at the end of winding onto the apparatus.

The steps of winding a section of hair around the connector portion 4 of the curler 1 are best shown in FIGS. 8*a* to 8*b*.

The embodiment illustrated in FIGS. 5 and 6 may also be provided with holes 18 in either or both of the side members 12, 13 as shown in FIGS. 5*a* and 5*b*. The curler 10 may also, or alternatively, be provided with holes 7 in the connector portion 14, which is preferably hollow. In the figures, the holes 18, 7 are only shown applied to half of the curler 10 to illustrate different embodiments of the curler 10. If holes 18, 7 are present they are preferably evenly spaced around the side members 12, 13 and/or the connector portion 14. The holes 18, 7 are an optional feature which allow circulation of air to hair wound around the connector portion 14 which may help hasten the drying of wet hair within the curler 10.

Figure 8C:
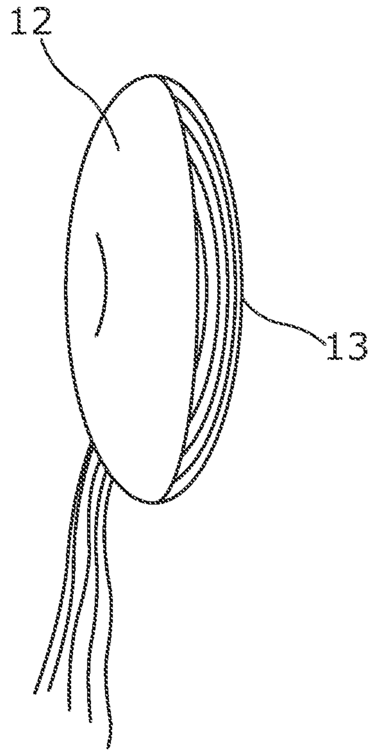
FIG. 8*c* is a schematic representation showing the section of hair at the end of the winding process with the apparatus closed.

An end of the section of hair may be secured in a slot 15 in the substantially flat side member 13 as before and as shown in FIG. 8*a*. The section of hair is wound around the connector portion 14 and upon itself to form a coil as shown in FIG. 8*b*. The curved side member 12 is then folded over, such that the curler 10 is now in the second, closed configuration as shown in FIG. 8*c*. The curved side member 12 now covers the other side member 13 and secures the hair inside the curler 10. Straightening irons, or another heat source, are then used to heat the curler 10 in the same way as previously described.

By forming a coil of hair that is narrow in width compared to the diameter of the coil, the hair contain in the curler may be heated and cooled both rapidly and evenly, resulting in a lasting curl.

Figure 9A:
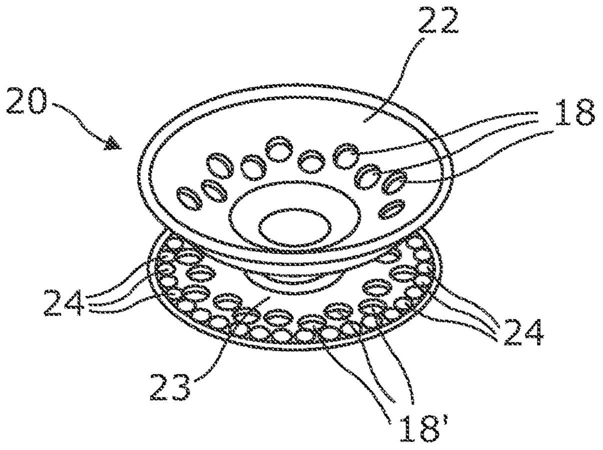
FIG. 9*a* is a perspective view of a further embodiment of an apparatus for curling hair, in an open configuration.
Figure 9B:
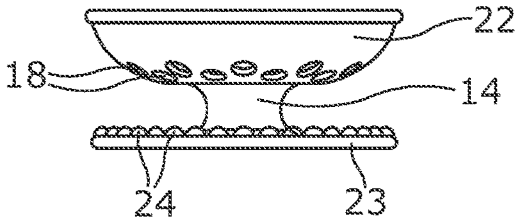
FIG. 9*b* is a side view of the apparatus of FIG. 9*a;*

FIGS. 9*a* and 9*b* illustrate an alternative embodiment of the apparatus of the invention, which is similar in shape to the embodiment illustrated in FIG. 5*a* and takes the form of a curler shown generally at 20. Curler 20 comprises two spaced apart side members 22, 23 connected by a connector portion 14. As with the previous embodiment of the invention, one of the side members 23 is substantially flat in profile and the other side member 22 is curved in shape. The side member 22 which is curved in shape is configured such that it has two fixed states. The first fixed state is illustrated in FIG. 9*a*, where the side member 22 is convex in shape and curves away from the other side member 23. This is the open configuration of the curler 20, and allows for hair to be wound around the connector portion 14. The second fixed state is the same as that illustrated in FIG. 5*b*, whereby the curved side member 22 is folded over so that it is now concave in shape and curves over the top of the connector portion 14 and the other side member 23. This is the closed configuration of the curler 20, and allows hair wrapped around the connector portion 14 to be secured within the curler 20. The curler 20 is fabricated from a silicon rubber that is thermally conductive.

In this embodiment the curler 20 is provided with a number of holes 18 18' on either one of, or both side members 23, 24. As described in relation to FIGS. 5 and 6, holes 7 may also be present on the connector portion 14. The holes 18, 18', 7, are an optional feature which allow circulation of air to hair wound around the connector portion 14. The substantially flat side member 23 is also provided a number of protrusions 24 spaced around the outer circumference of the side member 23 and oriented inwardly, towards the opposing side member 22. The protrusions 24 help to grip the hair and help prevent the curler 20 from slipping off the hair when the curler 20 is in the closed configuration with hair wrapped around the connector portion 14. The curler 20 may additionally be provided with a slot (not shown) for securing the end of a strand of hair as described in relation to the previous embodiment.

Figure 10:
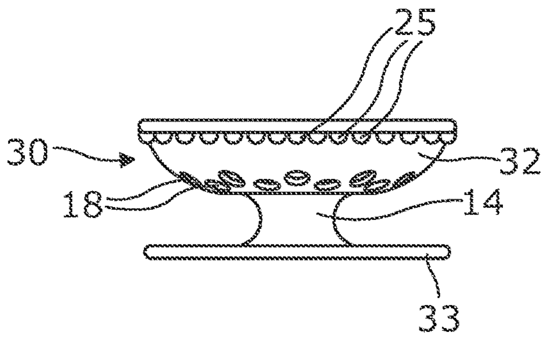
FIG. 10 is a side view of an alternative embodiment of an apparatus for curling hair, in an open configuration.

FIG. 10 illustrates a further alternative embodiment of the apparatus of the invention, which is similar in shape to the embodiment illustrated in FIG. 9*a* and takes the form of a curler shown generally at 30. Curler 30 comprises two spaced apart side members 32, 33 connected by a connector portion 14. As with the previous embodiment of the invention, one of the side members 33 is substantially flat in profile and the other side member 32 is curved in shape. In this embodiment of the apparatus, the curved side member 32 is provided with a plurality of protrusions 25 spaced around the outer circumference of the side member 32. As with the previous embodiment, the protrusions 25 help to grip the hair and help prevent the curler 30 from slipping off the hair when the curler 30 is in the closed configuration with hair wrapped around the connector portion 14. The curler 30 may additionally be provided with a slot (not shown) for securing the end of a strand of hair as described in relation to the previous embodiments.

Figure 11A:
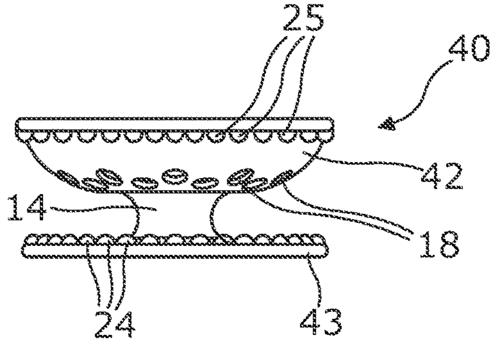
FIG. 11*a* is a side view of an alternative embodiment of an apparatus for curling hair, in an open configuration.
Figure 11B:
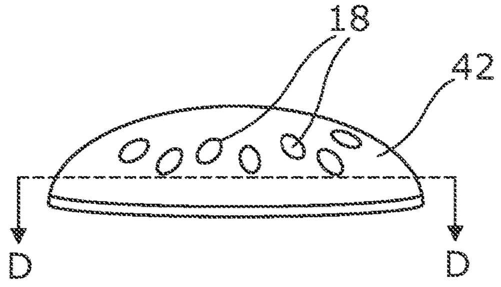
FIG. 11*b* is a side view of the apparatus of FIG. 11*a*, in a closed configuration.
Figure 11C:
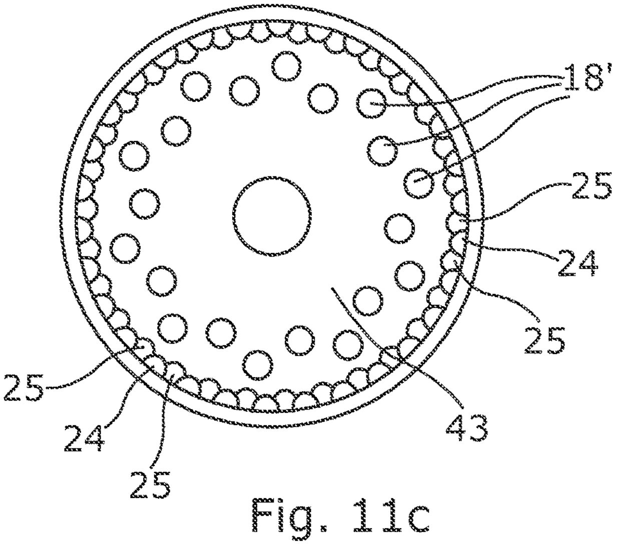
FIG. 11*c* shows a cross section through the apparatus of FIG. 11*b*, along the line D-D, with the apparatus in the closed configuration.

FIG. 11*a* illustrates a further alternative embodiment of the apparatus of the invention, which is similar in shape to the embodiment illustrated in FIG. 9*a* and takes the form of a curler shown generally at 40. Curler 40 comprises two spaced apart side members 42, 43 connected by a connector portion 14. As with the previous embodiment of the invention, one of the side members 43 is substantially flat in profile and the other side member 42 is curved in shape. In this embodiment of the apparatus, both of the side members 42, 43 are provided with a plurality of protrusions 25, 24 spaced around the outer circumference of each side member 42, 43. As with the previous embodiment, the protrusions 25, 24 help to grip the hair and help prevent the curler 40 from slipping off the hair when the curler 40 is in the closed configuration, illustrated in FIG. 11*b*, with hair wrapped around the connector portion 14. As shown in FIG. 11*c*, the protrusions, 25, 24 are preferably spaced around the circumference of each side member 42, 43 such that when the curler 40 is in the closed configuration of FIG. 11*b*, one set of protrusions 25 are located in between the other set of protrusions 24. The curler 40 may additionally be provided with a slot (not shown) for securing the end of a strand of hair as described in relation to the previous embodiments.

The embodiments of the apparatus illustrated in FIGS. 9*a* to 11*c* may include holes 18, 18' on either or both of the side members. Alternatively, or additionally, the apparatus may include holes 7 on the connector member 14. The holes 18, 18', 7 may help heated hair to cool more quickly, and/or wet hair to dry more quickly.

The invention claimed is:

1. A one-piece apparatus for curling hair comprising first and second side portions and a connector portion, the first and second side portions secured together in a spaced apart relationship by the connector portion, said connector portion being positioned substantially centrally with respect to each side portion; wherein the one-piece apparatus is fabricated from resilient and thermally conductive silicone rubber, and wherein the connector portion is hollow and is defined by a substantially cylindrical wall extending between said first and second side portions and connected to both the said first and second side portions, and wherein the said connector portion has a length of not more than 20 mm and the said first and second side portions each have a width that is at least three times larger than the length of the said connector portion, and wherein the said first and second side portions and the substantially cylindrical wall of the said connector portion are of uniform thickness and resilience, one of the first and second side portions is substantially flat and the other of the first and second side portions is curved wherein the first side portion is configured such that it is provided with two fixed states: a first state in which the first side portion is convex in shape and bends away from the second plate; and a second fixed state in which the first side portion is concave in shape and folds over to cover both the connector portion and the second side portion; and the said one-piece apparatus is configured, by its resilience and thermal conductivity, to transfer heat from heater plates clamped around the said first and second side portions to hair that has been wound around the said connector portion.

2. The one-piece apparatus according to claim 1, wherein the connector portion has a length not more than 15 mm.

3. The one-piece apparatus according to claim 1, the side portions each having a width that is at least six times larger than the length of the connector portion.

4. The one-piece apparatus according to claim 1, wherein at least one of the side portions is provided with means for securing an end of a section of hair to the apparatus.

5. The one-piece apparatus according to claim 4, wherein the means for securing an end of a section of hair to the apparatus comprises a slot with an opening at an edge of the at least one side portion.

6. The one-piece apparatus according to claim 1, wherein each of the first and second side portions are circular in shape.

7. The one-piece apparatus according to claim 1, wherein both the first and second side portions are substantially flat.

8. The one-piece apparatus according to claim 1, wherein the first side portion is configured such that it is provided with two fixed states: a first state in which the first side portion is convex in shape and bends away from the second plate; and a second fixed state in which the first side portion is concave in shape and folds over to cover both the connector portion and the second side portion.

9. The one-piece apparatus according to claim 8, each of the first and second side portions having an outer circumference and wherein at least one of the first and second side portions is provided with a plurality of protrusions located on the outer circumference, oriented towards the other side portion.

10. The one-piece apparatus according to claim 9, wherein both of the first and second side portions are provided with a plurality of protrusions located on the outer circumference of each side portion, wherein the protrusions on each side portion are oriented towards the other side portion.

11. The one-piece apparatus according to claim 10, wherein the protrusions are arranged such that the protrusions of first side portion are located in between the protrusions of the second side portion when the first side portion is folded over to cover both the connector portion and the second side portion.

12. The one-piece apparatus according to claim 1, wherein at least one of the first and second side portions are provided with a plurality of holes therein.

13. The one-piece apparatus according to claim 1, wherein the connector portion is provided with a plurality of holes therein.

14. The one-piece apparatus of claim 1, wherein said apparatus is formed of a material which changes colour when heated to a first temperature and reverts to its original when cooled.

* * * * *